United States Patent
Poisel

(10) Patent No.: US 6,278,815 B1
(45) Date of Patent: Aug. 21, 2001

(54) DEVICE FOR TRANSMITTING OPTICAL SIGNALS BETWEEN TWO DYNAMICALLY DECOUPLED SYSTEMS

(75) Inventor: Hans Poisel, Leinburg (DE)

(73) Assignee: Schleifring und Apparatebau GmbH (DE)

( * ) Notice: Subject to any disclaimer, the term of this patent is extended or adjusted under 35 U.S.C. 154(b) by 0 days.

(21) Appl. No.: 09/446,953
(22) PCT Filed: May 5, 1998
(86) PCT No.: PCT/DE98/01258
§ 371 Date: Mar. 13, 2000
§ 102(e) Date: Mar. 13, 2000
(87) PCT Pub. No.: WO99/04309
PCT Pub. Date: Jan. 28, 1999

(30) Foreign Application Priority Data

Jul. 17, 1997 (DE) .............................. 197 30 925

(51) Int. Cl.$^7$ ....................................... G02B 6/26
(52) U.S. Cl. ................... 385/25; 385/37; 385/88; 359/130
(58) Field of Search .................. 385/25, 37, 24, 385/88; 359/130

(56) References Cited

U.S. PATENT DOCUMENTS

| | | |
|---|---|---|
| 4,749,248 | 6/1988 | Aberson, Jr. et al. ............ 350/96.19 |
| 4,962,986 | 10/1990 | Hompel et al. .................. 350/96.15 |
| 6,104,852 * | 8/2000 | Kashyap .............................. 385/123 |

* cited by examiner

Primary Examiner—Darren Schuberg
Assistant Examiner—Fayez Assaf
(74) Attorney, Agent, or Firm—St. Onge Stewart Johnston & Reens LLC

(57) ABSTRACT

What is described here is a device for optical signal transmission between two dynamically decoupled systems, preferably two systems moving relative to each other, comprising at least one emitter means including a first source of light, which is mounted on said first system, as well as a receiver means including at least one fiber optical wave guide, which is mounted on said second system and along which said light source is moved and into which the light of said light source can be injected. The invention is characterized by the provisions that a photo refractive layer is applied at least on that surface of said fiber optical wave guide which is immediately opposite to said first light source, and that at least one source of coherent light is mounted on said first system, which emits light which dynamically imprints an optical grating into said photo refractive layer due to beam superimposition at the site where the light is injected, which grating presents refractive properties for the light of said first source of light so that the light can be injected into said optical fiber

12 Claims, 2 Drawing Sheets

DEVICE FOR TRANSMITTING OPTICAL SIGNALS BETWEEN TWO DYNAMICALLY DECOUPLED SYSTEMS

FIELD OF THE INVENTION

The invention relates to a device for optical signal transmission between two dynamically decoupled systems, comprising at least on e emitter means including a first source of light, which is mounted on the first system, as well as a receiver means including at least one fibre optical wave guide, which is mounted on the second system and into which the light of said light source can be injected.

PRIOR ART

For the optical signal transmission between two spatially separate components, which are, as a rule, moreover moving relative to each other, light of a light emitter mounted on one component is injected into a wave guide which is mounted on the opposite component, and is then passed on inside the wave guide towards an appropriate light detector unit. An essential criterion of the quality of the signal transmission process is the introduction of the light into the wave guide because the process of coupling light into the wave guide with a subsequent transfer of the light inside the wave guide up to signal conversion in a detector array is linked up with high losses.

It is common that the wave guide, which is configured as a fibre optical wave guide, is irradiated in a direction orthogonal on the surface of the optical fibres so that the light fraction injected into the wave guide is equally oriented in a direction normal on the longitudinal axis of the fibre optical wave guide. With detector arrays being normally arranged at the fibre ends, only those fractions of the light injected into the optical fibre contribute to signal transmission which can propagate along the direction of the longitudinal axis of the optical fibre and which arrive at the detector array by way of total reflection relatively free of loss. With the aforedescribed lateral irradiation, this fraction is generally negligible. Therefore provisions must be made for deflecting the largest fraction possible of the light injected into the optical fibre in a direction towards the longitudinal axis o the fibre in such a way as if the light were injected at a face side of the optical fibre. For instance, the German Patent DE 28 46 526 C2 discloses an X-ray display unit providing for an annular optical wave guide having an out side contour al on g which a light source is moved as signal source. For deflecting the radiation orthogonally injected into the optical wave guide along the longitudinal direction of the optical wave guide steps are provided on the inside of the optical wave guide, which extend over the entire periphery of the optical wave guide and induce a light reflection so that the light of the light source, which is injected into the optical wave guide, will be uniformly distributed over the entire periphery of the optical wave guide. An appropriate receiver unit is provided on at least one end of the optical wave guide for detection of the light. Even though, on the one hand, the stepped configuration of the inside of the optical wave guide is suitable to deflect the light orthogonally injected into the optical wave guide into a direction along the longitudinal extension of the fibre, this structure impairs, on the other hand, the propagation characteristics of the light along the wave guide axis substantially so that the light guided within the wave guide is partly coupled out from the wave guide by refraction and reflection on the stepped contours and is hence subjected to substantial losses.

Moreover, solutions have become known which leave the guide guidance within the optical wave guide largely uninfluenced; to this end, for instance, the wave guide configured as fibre optical wave guide, contains fluorescent substances which emit fluorescent light in response to energetic excitation by irradiation. Those light fraction s of the fluorescent light which can propagate along the longitudinal extension of the fibre contribute to signal transmission within the optical wave guide. On e example of this type is apparent from the German Patent DE 44 21 616 A1 which describes a device for transmitting and receiving circulating light signals. Even though the light, which is guided by total reflection along t he longitudinal axis of the fibre, propagates in the optical fibre largely without any losses because this fibre presents a contour without any geometric impairment, the transmission of the optical signals is restricted with respect to high transmission rates on account of the delayed fluorescent effect, which is a disadvantage for an optimised use of data transmission channels.

In an approach to avoid the aforedescribed disadvantages of fluorescent light and yet any impairment of the wave-guiding characteristics of an optical fibre wave guide it is common to use a coupler prism for injecting the light, which is disposed on the surface of the optical fibre and through which the light orthogonally incident onto the surface of the optical wave guide is deflected by the coupler prism by means of refraction so that the light injected into the optical fibre will advance in a direction inclined relative to the longitudinal axis of the optical fibre and will be guided inside the optical fibre by means of total reflection. When, however, the light emitter moves relative to the optical fibre the coupler prism must be passed along, too, simultaneously with the light emitter, over the optical fibre, whilst attention must be paid to the fact that the spacing—which is in orders of magnitudes in the $\mu$m range—between the coupler prism and the optical fibre must be observed with extreme precision so that a high-precision mechanism is required which is not attractive for application in operation in terms of structure and particularly in financial terms.

The invention is now based on the problem of improving a device for optical signal transmission between two dynamically decoupled systems, preferably two systems moving relative to each other, comprising at least one emitter means including a first source of light, which is mounted on the first system, as well as a receiver means including at least one optical fibre, which is mounted on the second system, and having an extension along which the source of light is moved and into which the light of said light source can be injected in, in such a way that the optical coupling of the light originating from the emitter means into the optical fibre can be implemented without major losses if possible. In particular, the highest light fraction possible should be guided within the optical fibre along the longitudinal direction, whilst the light-guiding characteristics of the fibre should be left uninfluenced for an unimpaired propagation of the light inside the optical fibre by means of total reflection. The measures to be performed to this end should be moreover be suitable for production at low costs and not cause any problems in application so that the device may be used for operation at any site required.

The solution to the problem underlying the present invention is defined in the claims 1, 4 and 6. Features defining expedient improvements of the inventive idea are the subject matters of the dependent claims.

A device in accordance with the introductory clause of claim 1 is configured in correspondence with the invention in such a way that a photo refractive layer is applied on at least that surface of the optical fibre which is directly opposite to the first source of light, and that at least one source of coherent light is provided on the first system, which emits light which dynamically imprints an optical grating into the photo refractive layer due to beam superimposition at the site where the light is injected, which grating presents refractive properties for the light of the first source of light so that the light can be injected into the optical fibre.

The inventive idea makes use of the property of photo refractive materials having non-linear optical properties in a form that their refractive indices can be varied by irradiation with light. It is possible in particular to generate an interference pattern by selective interference of two coherent light beams and to image it onto a layer of photo refractive material so that, for instance, a sinusoidal distribution of light intensities will be produced on the surface of the layer of photo refractive material. In correspondence with the distribution of light intensities, the charges contained in the layer of photo refractive material are moving and generate an electrical field undergoing an equally sinusoidal variation of its intensity. This field, in its turn, deforms the material layer in the same periodic manner and causes variations of the refractive index. In this way, a so-called refractive index grating or refractive index volume hologram is formed. More detailed explanations of this phenomenon can be read in the paper by D. M. Pepper "Der photorefraktive Effekt" [The photo refractive effect] in Spektrum der Wissenschaft, December 1990, pages 72 to 79.

The principal idea supporting the present invention relates to the generation of a coupling site located locally on the surface of the fibre optical wave guide for the light directed from the emitter unit onto the fibre optical wave guide. The coupling site on the fibre optical wave guide is three-dimensionally limited so that the remaining part of the fibre optical wave guide will be left uninfluenced by the light guided inside the fibre optical wave guide.

This coupling site is so created that firstly the fibre optical wave guide is preferably surrounded completely by a layer of photo refractive material having a refractive index in the non irradiated condition which is identical with or similar to the refractive index of the optical fibre. Moreover, a source of coherent light is disposed on the system carrying the emitter means, which is provided for generating an interference pattern on the surface of the layer of photo refractive material at the location of the coupling site.

It is possible to split the beam from the light source by means of a beam splitter and to superimpose it via an appropriate arrangement of mirrors for generating a dual-beam superimposition using only a single source of coherent light. As an alternative, also two or more separate sources of coherent light may be provided on the system of the emitter means which emit separate light-beams that can be superimposed in a suitable manner.

Additionally, an alternative inventive embodiment provides the feature that a light source, which does not necessarily emit coherent light and which is fixedly coupled to the system of the emitter means, is used for generating a light pattern on the photo refractive layer of the light guide system by irradiation of a mask, which light pattern serves to vary the refractive index within the layer of photo refractive material periodically in the manner of an optical grating which is effective for the light from the light source of the emitter means.

The optical phase grating forming at the coupling site dynamically in terms of time enables the light to be injected into the fibre optical wave guide to follow directions of propagation within the optical fibre, on account of diffraction, which results in modes guided in the optical fibre. With the coupling grating forming only at the location of the actual coupling site due to selective irradiation, it is possible to continue the guidance free from interference of the beams, which are already injected into the optical fibre, by total reflection throughout the remaining part of the optical fibre.

With the layer of photo refractive material varying its refractive index only in the case of selective irradiation with light and assuming its original refractive index in the event of no irradiation, the optical phase grating is shifted dynamically along the extension of the optical fibre simultaneously with the emitter means. Insofar the effect of dual-beam superimposition on photo refractive materials, which is known per se, is particularly well suited for optical signal transmission between two systems moving relative to each other, as this is the case, for instance, with fibre optical slip rings.

Another inventive embodiment for coupling light into a fibre optical wave guide with utilisation of the photo refractive effect provides for an optical fibre having a surface into which a physically configured grating structure is formed, preferably in the manner of recesses and projections which are mechanically produced in the contour of the optical fibre and which, considered per se, represent a diffraction grid for the light to be injected into the fibre optical wave guide. A layer of photo refractive material is applied directly on the structured surface of the optical fibre such that it is flush with the produced structure as well as with a smooth surface of a material layer opposite to the structure.

In the case of non irradiation the layer of photo refractive material must be regarded merely as an optically transparent layer surrounding the fibre optical wave guide, which does not produce any optical effect because it joins the structured surface of the fibre optical wave guide directly, specifically since the refractive index of the layer of photo refractive material is identical with the refractive index of the optical fibre. A light wave guided inside the fibre optical wave guide in this condition passes freely through the contact layer between the fibre optical wave guide and he layer of photo refractive material, undergoes total reflection on the surface of the layer of photo refractive material, for instance, and is guided inside the optical fibre in this manner.

A light source, which need not necessarily emit coherent light, is mounted on the system carrying the emitter unit for irradiating the coupling site with largely homogeneous light merely over a restricted range so that the refractive index of the photo refractive layer is varied and the grating structure formed in the optical fibre produces its optical effects. The light emitted by the emitter means passes through the irradiated layer of photo refractive material and is diffracted on the optically effective phase grating into the optical fibre in such a manner that the injected beams will be guided within the fibre optical wave guide by way of total reflection.

With the phase grating used in the aforementioned embodiment being physically invariably provided on the surface of the fibre optical wave guide and with the layer of photo refractive material not varying its refractive index for a temporary optical efficiency of the phase grating for the light to be injected in but in response to homogeneous irradiation, it is also possible to use alternative materials which vary their indices of refraction in response to the introduction of light from outside. To this end electrically sensitive materials are suitable, for instance, which vary their refractive index in response to the application of an external voltage. To this end, for examples, electrodes must be disposed around the coated optical wave guide such that their refractive index will vary as a function of the actual coupling site, i.e. as a function of the actual position of the emitter means relative to the fibre optical wave guide, with the result that the light originating from the first light source penetrates through the optically transparent layer largely without any loss and is injected into the fibre optical wave guide by diffraction by the grating structure.

Moreover, liquid crystal layers or layers made of electro rheologic liquids can be applied directly onto the core of the glass fibre, which layers form a diffraction grating directly in response to a corresponding introduction of energy from the outside, on account of a local variation of the refractive index, or which make the aforementioned hidden grating structures apparent on the surface of the fibre optical wave guide in the case of a uniform variation of the refractive index.

BRIEF DESCRIPTION OF THE DRAWINGS

The invention will be described in the following by exemplary embodiments, without any restriction of the general inventive idea, with reference to the drawings wherein.

DESCRIPTION OF EMBODIMENTS

Figure 1:
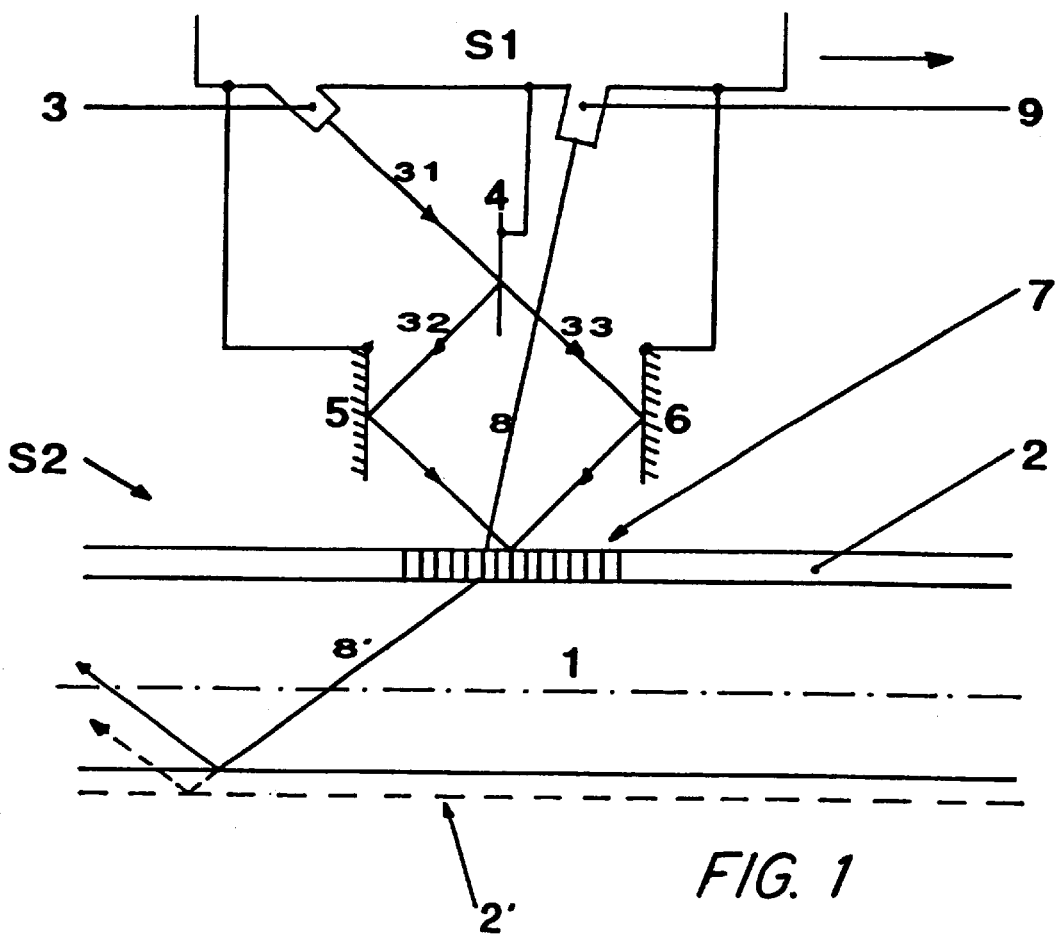
FIG. 1 illustrates a coupler system with a source of coherent light for generating an interference pattern on the surface of a photo refractive layer.

FIG. 1 is a schematic illustration of a device for optical signal transmission which shows a mobile system S1 relative to a stationary system S2. The stationary system S2 consists of a fibre optical wave guide 1 which comprises a photo refractive layer 2 at least on its surface immediately opposite to the mobile system S1. The lower dashed line 2' below the fibre optical wave guide 1 is merely meant to indicate that the photo refractive layer 2 may completely enclose the optical fibre 1.

The mobile system S1, which is preferably moved over the stationary system S2 at a constant spacing (cf. direction of the arrow), comprises a source of coherent light 3 which emits a light beam 31 directed onto a beam splitter unit 4 that generates light beams 32 and 33 with the same intensity. Moreover, mirrors 5, 6 are provided which are fixedly connected to the mobile system S1 and on which the light beams 32 and 33 are so refracted that a superimposition of the beams is achieved in the region of the photo refractive layer 2. The interference pattern 7 which is produced on the surface of the photo refractive layer 2 results in a periodically variable refractive index within the photo refractive layer 2, which causes the formation of a grating structure during the moment of irradiation, and on which the light beam 8, which is emitted from the light source 9 of the emitter means, is diffracted into the fibre optical wave guide 1 such that the injected light beam 8' can be guided inside the fibre optical wave guide by way of total reflection 10 (the dashed line indicating the injected light beam 8' provides for a total reflection on the boundary layer between the air and the photo refractive layer 9 because in the condition without irradiation the refractive index $n_s$ of the photo refractive layer is identical with the refractive index $n_k$ of the fibre optical wave guide.

One essential aspect of the inventive device resides in the fact that the range of the interference pattern where a diffraction grating is formed in the photo refractive layer 2 moves simultaneously along with the mobile system S1, which means that the photo refractive layer returns into its original state again immediately upon an irradiation step and adapts itself again to the refractive index of the optical fibre when the material is appropriately selected.

Figure 2:
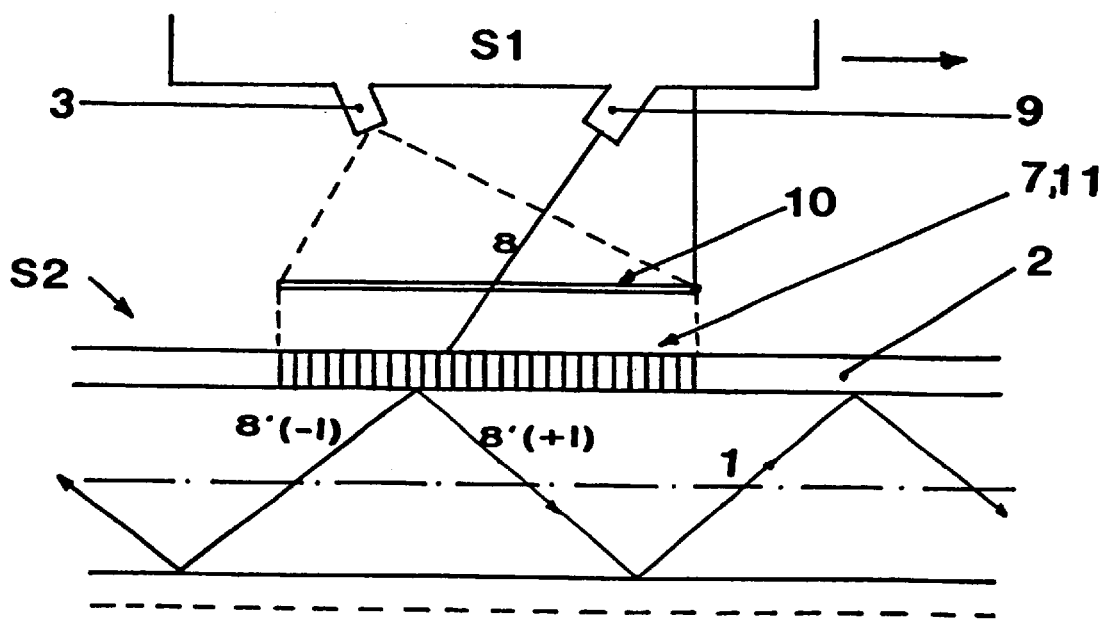
FIG. 2 shows an array with a mask for generating a phase grating within the photo refractive layer.

According to FIG. 2 the mobile system S1 comprises, in addition to the light source 9 provided for signal transmission, a source 3 of irradiation light for illuminating a mask 10 in which a sinusoidal grating is formed, for example. The image of the mask on the photo refractive layer 2 generates in its turn a sinusoidal grating 11 on the light beam 8 in the positive and negative first order is diffracted (cf. the injected beams 8'(−1), 8" (+1)).

The mobile system S1 on which the mask 10 is fixedly mounted moves in parallel with the optical fibre 1 along the direction of the arrow, generating a dynamic diffraction grating, which is merely limited to the narrow defined range of the coupling site, in the respective radiation field of the light source 3 that emits light which penetrates the mask 10.

Figure 3:
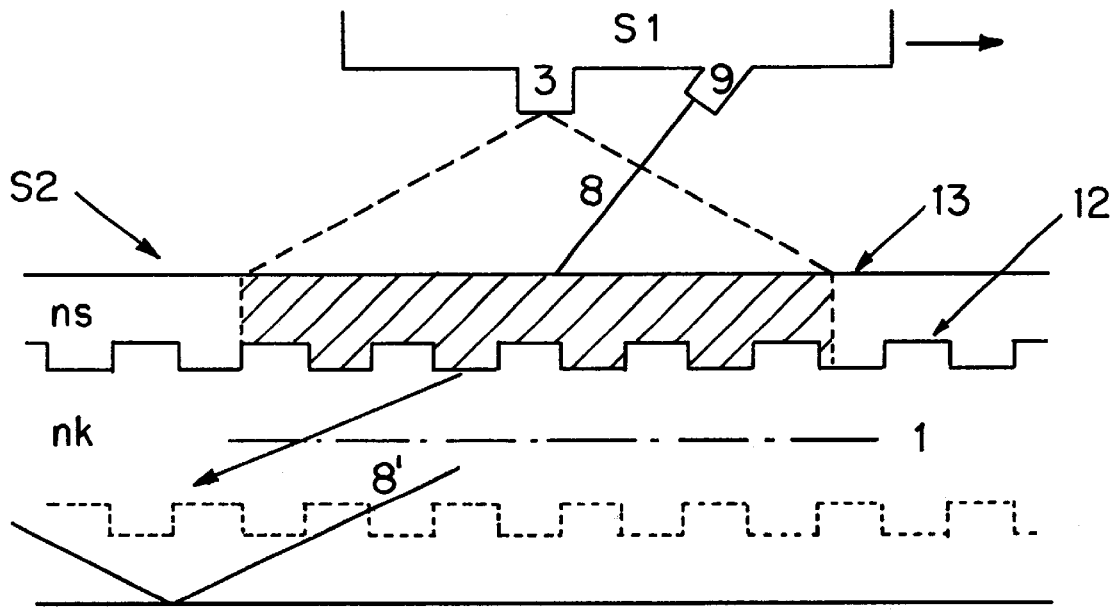
FIG. 3 illustrates the principle of irradiation with a phase grating invariably produced on the surface of the fibre optical wave guide.

FIG. 3 illustrates an array of fibre optical wave guides wherein the surface of the optical fibre is provided with a physically formed structure 12 which is configured in the manner of a diffraction grid. The fibre optical wave guide 1 is surrounded by a photo refractive layer 2 presenting a smooth outside 13. In the non irradiated state, the photo refractive layer 2 has the same refractive index as the fibre optical wave guide 1 so that the boundary layer between the optical fibre 1 and the photo refractive layer 2 is optically inefficient. Light beams 8 injected into the fibre optical wave guide pass through the boundary layer, without being hindered, and undergo total reflection on the surface of the photo refractive layer 2.

When, however, the photo refractive layer 2 is irradiated by means of a light source 3, which causes it to vary its refractive index, the grating structure 12 on the surface of the optical fibre1 produces an optical effect on which the injected light 8 is diffracted and deflected into the interior of the fibre optical wave guide.

Figure 4:
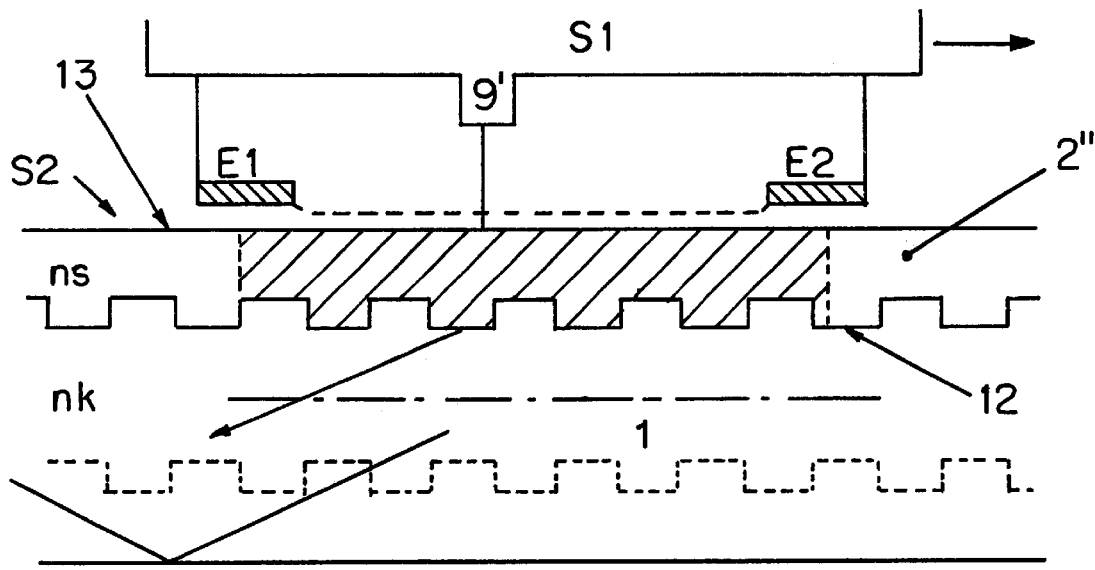
FIG. 4 shows an array with an electrically sensitive material over a fibre optical wave guide comprising a phase grating.

FIG. 4 illustrates an alternative array in which layer 2" of electro-sensitive material is used instead of the photo refractive layer 2; this layer 2" has a refractive index which varies as a function of an esternal electrical field. Electrode bodies E1, E2 are mounted on the mobile system S1, between which oriented lines of an electrical field are extending so that the refractive index of the electrically sensitive layer 2" will vary in the aforedescribed manner. As is shown in FIG. 4, the light beam 8, which is incident on the electrically sensitive layer between the electrodes E1 and E2, arrives on the surface structure 12 at which the light beam is deflected into the interior of the fibre optical wave guide 1.

LIST OF REFERENCE NUMERALS

S1 mobile system
S2 stationary system
1 fibre optical wave guide
2 photo refractive layer
2' surface of the photo refractive layer 2" electrically sensitive layer
3 light source
31, 32, 33 light beams
4 beam splitter unit
5,6 mirrors
7 interference pattern, diffraction grating
8 light beam
8' injected light beam
8'(−1) diffracted light beam of the −1. order
8'(+1) diffracted light beam of the +1. order
9 light source on the emitter means
10 mask
11 sinusoidal grating
12 surface structure
13 outside of the photo refractive layer
E1,E2 electrode bodies
$n_s$ refractive index of the photo refractive layer
$n_k$ refractive index of the fibre optical wave guide

What is claimed is:

1. Device for optical signal transmission between two dynamically decoupled systems, the two systems moving relative to each other; comprising at least one emitter means including a first source of light, which is mounted on said first system, as well as a receiver means including at least one fiber optical wave guide, which is mounted on said second system and along which said light source is moved and into which the light of said light source is injected, characterized in that a photo refractive layer is applied at least on that surface of said fiber optical wave guide which is immediately opposite to said first light source and that at least one source of coherent light is mounted on said first system, which emits light which dynamically imprints an optical grating into said photo refractive layer due to beam superimposition at the site where the light is injected, which grating presents refractive properties for the light of said first source of light so that the light is injected into said optical fiber.

2. Device according to claim 1, characterized in that the light from said source of coherent light is incident on a beam splitter which causes the formation of two separate light beams which are caused to superimpose each other by means of a mirror system.

3. Arrangement according to claim 1, characterized in that at least two sources of coherent light are provided on said first system, which emits light beams which are directly caused to superimpose each other.

4. Device in accordance with claim 1, characterized in that a photo refractive layer is applied at least on that surface of said fiber optical wave guide, which is directly opposite to said first source of light, and that a further light source as well as an optical mask are provided on said first system in such a way that an optical grating is dynamically imprinted into said photo refractive layer by way of irradiation of said mask at the location of the light coupling site, which grating presents refractive properties for the light of said first source of light so that the light can be injected into said optical fiber.

5. Device according to claim 1, characterized in that in response to irradiation of said photo refractive layer said optical grating is formed merely at the actual coupling site between said first light source and said optical fiber coated with said photo refractive layer.

6. Device in accordance with claim 1, characterized in that a physically formed grating structure is formed at least in that surface of said optical fiber which is directly opposite to said first light source, and that an optically transparent layer is applied on said grating structure which presents a refractive index corresponding to the refractive index of said optical fiber and having a refractive index which is variable in response to the introduction of energy from outside.

7. Device according to claim 6, characterized in that said grating structure has refractive properties for the light of said first light source so that the light can be injected into said fiber optical wave guide.

8. Device according to claim 6, characterized in that said optically transparent layer consists of a photo refractive material which, in response to irradiation with light, varies its refractive index in such a way that the light originating from said first light source penetrates through said optically transparent layer largely without any loss and can be injected by said grating structure by diffraction into said fiber optical wave guide.

9. Device according to claim 6, characterized in that said optically transparent layer consists of an electrically sensitive material which varies its refractive index in response to the application of an external voltage.

10. Device according to claim 9, characterized in that electrodes are so disposed around said fiber optical wave guide that the refractive index is so variable as a function of the actual coupling site that the light originating from said first light source penetrates through said layer of electrically sensitive material largely without any loss and can be injected by said grating structure by diffraction into said fiber optical wave guide.

11. Device according to claim 6, characterized in that said optically transparent layer has a smooth configuration on that surface which is opposite to said first light source.

12. Device according to claim 1, characterized in that said first and second systems are supported for rotation relative to each other, and that the array serves as optical slip ring for signal transmission between said two systems.

* * * * *